United States Patent
Kim et al.

(10) Patent No.: US 11,231,616 B2
(45) Date of Patent: Jan. 25, 2022

(54) COLOR CONVERSION SHEET, BACKLIGHT UNIT AND DISPLAY DEVICE

(71) Applicant: LG Display Co., Ltd., Seoul (KR)

(72) Inventors: KiSeong Kim, Gyeonggi-do (KR); HyeokJoon Yoon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/916,885

(22) Filed: Jun. 30, 2020

(65) Prior Publication Data
US 2021/0003889 A1    Jan. 7, 2021

(30) Foreign Application Priority Data

Jul. 3, 2019 (KR) .................. 10-2019-0079758

(51) Int. Cl.
*G02F 1/13357* (2006.01)
*G02F 1/1335* (2006.01)

(52) U.S. Cl.
CPC .. *G02F 1/133605* (2013.01); *G02F 1/133603* (2013.01); *G02F 1/133606* (2013.01); *G02F 1/133614* (2021.01); *G02F 2201/50* (2013.01); *G02F 2202/28* (2013.01)

(58) Field of Classification Search
CPC ......... G02F 1/133605; G02F 1/133606; G02F 1/133603; G02F 1/133608; G02F 2001/133607; G02F 2001/133614; G02F 1/133609; G02F 1/133611; G02F 1/133607; G02B 6/0055; G02B 6/0051; F21V 31/00; F21V 31/005; F21V 31/04; F21V 11/14; F21V 19/005
See application file for complete search history.

(56) References Cited

U.S. PATENT DOCUMENTS

| | | | |
|---|---|---|---|
| 9,535,282 B1* | 1/2017 | Stuppi | G02F 1/133617 |
| 9,736,900 B1* | 8/2017 | Stuppi | G02F 1/133603 |
| 9,810,942 B2* | 11/2017 | You | G02F 1/133609 |
| 2005/0280756 A1* | 12/2005 | Kim | G02F 1/133603 |
| | | | 349/114 |
| 2006/0291243 A1* | 12/2006 | Niioka | F21V 13/02 |
| | | | 362/607 |
| 2010/0033947 A1* | 2/2010 | Lin | G02F 1/133603 |
| | | | 362/84 |

(Continued)

*Primary Examiner* — Tsion Tumebo
*Assistant Examiner* — James M Endo
(74) *Attorney, Agent, or Firm* — Morgan, Lewis & Bockius LLP

(57) ABSTRACT

The present disclosure relates to a color conversion sheet, a backlight unit, and a display device, in which a reflection filter exhibiting transflection with respect to blue light may be disposed on a color conversion layer that excites blue light and then emits green light and red light and in which a reflection filter exhibiting total reflection of green light and red light may be disposed under the color conversion layer, thereby increasing the probability of exciting blue light and the amount of green light and red light emitted forwards, so that the efficiency of the color conversion sheet can be improved. In addition, it is possible to prevent a halo caused by the diffusion of light scattered backwards and to increase the brightness provided by the backlight unit by causing the light scattered backwards to be reflected forwards from the position adjacent to the color conversion layer.

12 Claims, 17 Drawing Sheets

(56) References Cited

U.S. PATENT DOCUMENTS

| | | | | |
|---|---|---|---|---|
| 2010/0244058 A1* | 9/2010 | Weng | ............... | G02F 1/133603 |
| | | | | 257/88 |
| 2011/0051412 A1* | 3/2011 | Jeong | ............... | G02F 1/133603 |
| | | | | 362/235 |
| 2011/0228193 A1* | 9/2011 | Shin | ...................... | F21V 11/00 |
| | | | | 349/61 |
| 2012/0243208 A1* | 9/2012 | Ying | ............... | G02F 1/133605 |
| | | | | 362/97.1 |
| 2013/0308337 A1* | 11/2013 | Chang | ................ | G02B 5/0231 |
| | | | | 362/606 |
| 2013/0334559 A1* | 12/2013 | Vdovin | .................. | H01L 33/54 |
| | | | | 257/98 |
| 2015/0159834 A1* | 6/2015 | Chang | ............... | G02F 1/133603 |
| | | | | 362/97.1 |
| 2016/0070137 A1* | 3/2016 | You | .................. | G02F 1/133603 |
| | | | | 349/71 |
| 2018/0023784 A1* | 1/2018 | Tamura | ............ | G02F 1/133611 |
| | | | | 362/235 |
| 2018/0080625 A1* | 3/2018 | Yamada | .................... | F21V 9/30 |
| 2018/0182940 A1* | 6/2018 | Yamamoto | ........ | G02F 1/133605 |
| 2019/0196270 A1* | 6/2019 | Hori | ................ | G02F 1/133611 |

\* cited by examiner

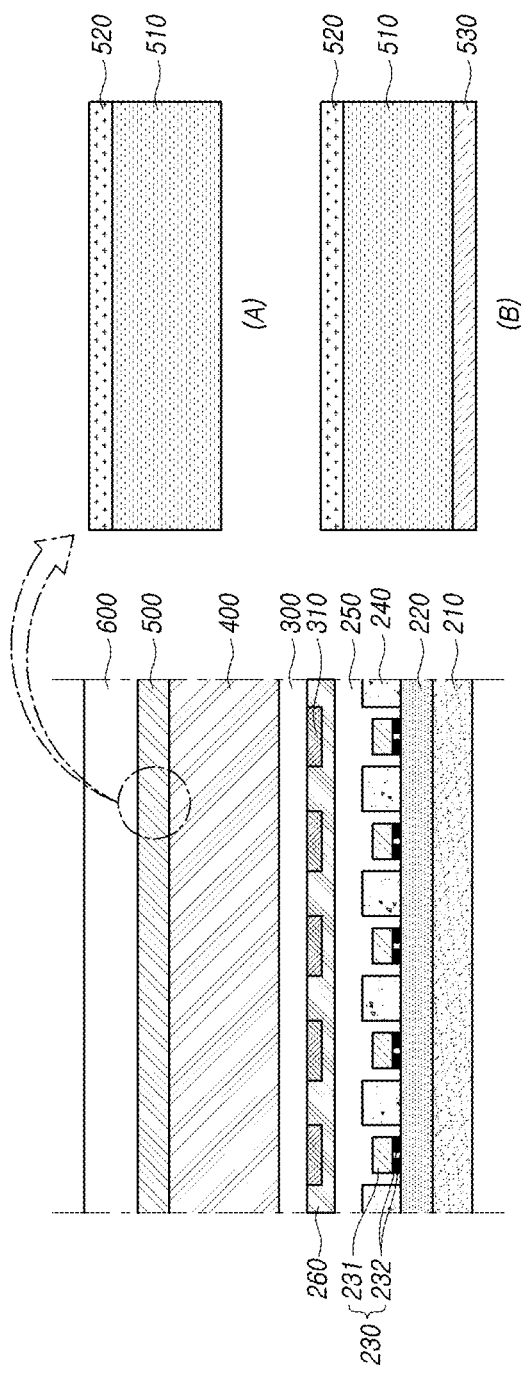

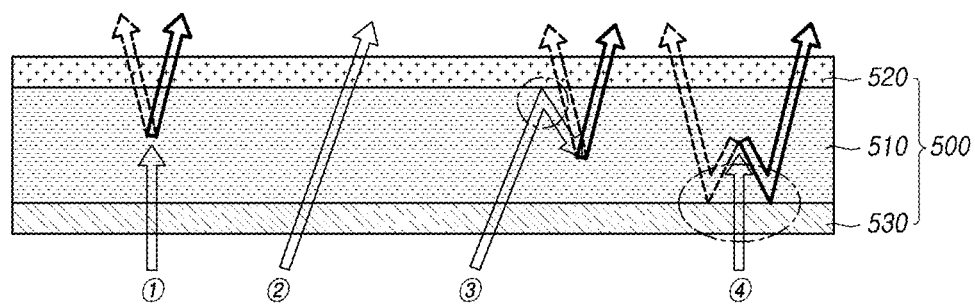
FIG. 7
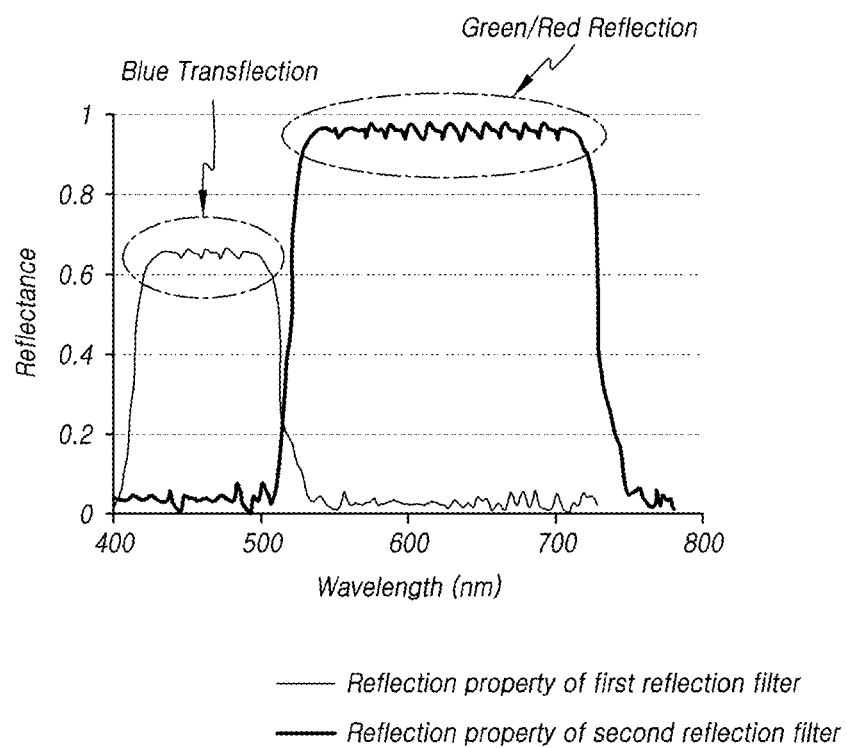

<Effect of increasing Green/Red Intensity>

— Before applying reflection filter
— After applying reflection filter

COLOR CONVERSION SHEET, BACKLIGHT UNIT AND DISPLAY DEVICE

CROSS REFERENCE TO RELATED APPLICATION

This application claims priority from Korean Patent Application No. 10-2019-0079758, filed on Jul. 3, 2019, which is hereby incorporated by reference for all purposes as if fully set forth herein.

BACKGROUND

Technical Field

Embodiments of the present disclosure relate to a color conversion sheet, a backlight unit, and a display device.

Discussion of the Related Art

The advent of the information-based society has brought increasing demand for display devices for displaying images, and various types of display devices such as liquid crystal display devices, organic light-emitting display devices, and the like are being utilized.

Among the above display devices, a liquid crystal display device may include a light source device such as a display panel and a backlight unit for supplying light to the display panel.

Accordingly, the thickness of the display device may be increased due to the backlight unit. If the thickness of the backlight unit is reduced in order to reduce the thickness of the display device, the optical gap between the light source and the display panel may not be sufficiently secured, which may degrade the image quality thereof.

In addition, in the case where the backlight unit excites light in a specific wavelength band and supplies white light, if the luminance efficiency is low, power consumption may increase, or the cost of manufacturing the backlight unit may increase, which makes it difficult to realize a backlight having high brightness.

SUMMARY

Accordingly, embodiments of the present disclosure are directed to a color conversion sheet, a backlight unit, and a display device that substantially obviates one or more of the problems due to limitations and disadvantages of the related art.

Embodiments of the present disclosure may provide a method capable of preventing the occurrence of hot spots and improving image quality while reducing the thickness of a backlight unit.

Embodiments of the present disclosure may provide a method capable of improving the luminance efficiency and providing white light without increasing the power consumption of a backlight unit or increasing the amount of color conversion material.

In an aspect, embodiments of the present disclosure may provide a display device including a display panel and a backlight unit configured to supply light to the display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, the backlight unit may include: a plurality of light sources configured to emit light in a first wavelength band; a reflection plate arranged in at least some of areas excluding the areas in which the light sources are arranged; and a color conversion sheet provided between the light source and the display panel.

In addition, the color conversion sheet may include: a color conversion layer configured to react to the light in the first wavelength band and emit light in a second wavelength band and light in a third wavelength band; a first reflection filter disposed on the upper surface of the color conversion layer; and a second reflection filter disposed on the lower surface of the color conversion layer.

The first reflection filter may have reflectance with respect to the light in the first wavelength band, and the second reflection filter may have reflectance with respect to the light in the second wavelength band and the light in the third wavelength band, wherein the reflectance of the first reflection filter for the light in the first wavelength band may be less than the reflectance of the second reflection filter for the light in the second wavelength band and the light in the third wavelength band.

In addition, the color conversion sheet may further include at least one light collection pattern arranged on the upper surface of the first reflection filter and configured to change the path of light emitted from the upper surface of the first reflection filter. Alternatively, a light collecting sheet configured to change the path of light emitted from the upper surface of the first reflection filter may be disposed on the color conversion sheet.

The backlight unit may further include: a light source protector disposed on the light sources and the reflection plate; and a transparent film provided between the light source protector and the color conversion sheet and having a plurality of light blocking patterns arranged on the lower surface thereof, wherein the plurality of light blocking patterns are arranged to correspond to the plurality of light sources, respectively.

In another aspect, embodiments of the present disclosure may provide a color conversion sheet including: a color conversion layer configured to react to the light in the first wavelength band and emit light in a second wavelength band and light in a third wavelength band; a first reflection filter arranged on a first surface of the color conversion layer and having reflectance for the light in the first wavelength band; and a second reflection filter arranged on a second surface facing the first surface of the color conversion layer and having reflectance for the light in the second wavelength band and the light in the third wavelength band.

According to embodiments of the present disclosure, it is possible to prevent hot spots while reducing the thickness of a backlight unit by providing light blocking patterns at positions corresponding to the light sources on the light sources, thereby improving the image quality.

According to embodiments of the present disclosure, it is possible to increases the probability of reusing blue light and to increase the amount of supply of red and green light, in the structure in which white light is supplied by exciting blue light, by placing a filter that reflects a portion of blue light on the top of the color conversion sheet and by placing a filter that reflects red and green light on the bottom of the color conversion sheet, thereby improving the luminance efficiency of the backlight unit.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 6 is a diagram illustrating an example of the structure of a color conversion sheet included in a backlight unit according to embodiments of the present disclosure;

FIG. 7 is a diagram illustrating an example of a path of light through a color conversion sheet according to embodiments of the present disclosure;

DETAILED DESCRIPTION

Figure 1:
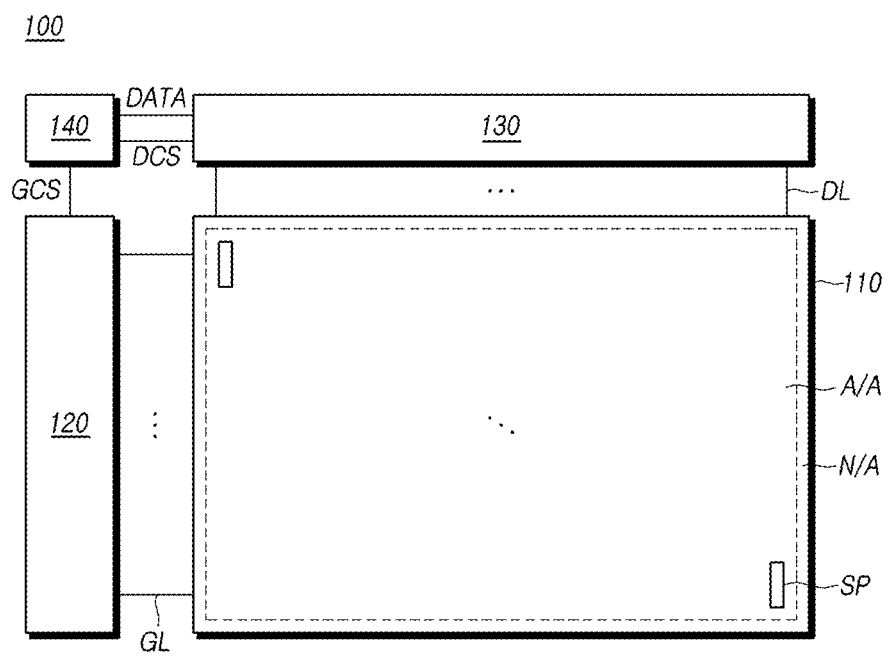
FIG. 1 is a diagram illustrating the schematic configuration of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative term, such as "after," "subsequent to," "next," "before," and the like, are used to describe processes or operations of elements or configurations, or flows or steps in operating, processing, manufacturing methods, these term may be used to describe non-consecutive or non-sequential processes or operations unless the term "directly" or "immediately" is used together.

In addition, when any dimensions, relative sizes etc. are mentioned, it should be considered that numerical values for an elements or features, or corresponding intonation (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a diagram illustrating the schematic configuration of a display device 100 according to embodiments of the present disclosure.

Referring to FIG. 1, a display device 100 according to embodiments of the present disclosure may include a display panel 110 including an active area (A/A) and a non-active area (N/A), and a gate driving circuit 120, a data driving circuit 130, and a controller 140 for driving the display panel 110.

A plurality of gate lines GL and a plurality of data lines DL may be arranged on the display panel 110, and subpixels SP may be disposed in the areas where the gate lines GL and the data lines DL intersect each other.

The gate driving circuit 120 is controlled by the controller 140, and sequentially outputs scan signals to the plurality of gate lines GL arranged on the display panel 110, thereby controlling the driving timing of a plurality of subpixels SP.

The gate driving circuit 120 may include one or more gate driver integrated circuits (GDICs), and may be positioned only on one side of the display panel 110, or may be positioned on both sides thereof depending on the driving method.

Each gate driver integrated circuit (GDIC) may be connected to a bonding pad of the display panel 110 by a tape automated bonding (TAB) method or a chip-on-glass (COG) method, or may be implemented by a gate-in-panel (GIP) method to then be directly arranged on the display panel 110. In some cases, the gate driver integrated circuit (GDIC) may be integrated with the display panel 110. In addition, each gate driver integrated circuit (GDIC) may be implemented by a chip-on-film (COF) method in which an element is mounted on a film connected to the display panel 110.

The data driving circuit 130 receives image data from the controller 140 and converts the image data into an analog data voltage. Then, the data driving circuit 130 outputs the data voltage to each data line DL according to the timing at which the scan signal is applied through the gate line GL so that each subpixel SP emits light having brightness according to the image data.

The data driving circuit 130 may include one or more source driver integrated circuits (SDICs).

Each source driver integrated circuit (SDIC) may include a shift register, a latch circuit, a digital-to-analog converter, an output buffer, and the like.

Each source driver integrated circuit (SDIC) may be connected to a bonding pad of the display panel 110 by a tape automated bonding (TAB) method or a chip-on-glass (COG) method, or may be directly disposed on the display panel 110. Alternatively, in some cases, the source driver integrated circuit (SDIC) may be integrated with the display panel 110. In addition, each source driver integrated circuit (SDIC) may be implemented by a chip-on-film (COF) method in which each source driver integrated circuit (SDIC) may be mounted on a film connected to the display panel 110, and may be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 may be mounted on a printed circuit board, a flexible printed circuit, or the like, and may be electrically connected to the gate driving circuit 120 and the data driving circuit 130 through the printed circuit board, the flexible printed circuit, or the like.

The controller 140 allows the gate driving circuit 120 to output a scan signal according to the timing implemented in each frame, converts a data signal received from the outside into the data signal for mat used in the data driving circuit 130, and then outputs the converted image data to the data driving circuit 130.

The controller 140 receives, from the outside (e.g., a host system), various timing signals including a vertical synchronization signal (VSYNC), a horizontal synchronization signal (HSYNC), an input data enable (DE) signal, a clock signal (CLK), and the like, as well as the image data.

The controller 140 may generate various control signals using various timing signals received from the outside, and may output the control signals to the gate driving circuit 120 and the data driving circuit 130.

For example, in order to control the gate driving circuit 120, the controller 140 outputs various gate control signals GCS including a gate start pulse (GSP), a gate shift clock (GSC), a gate output enable signal (GOE), or the like.

In this case, the gate start pulse (GSP) controls the operation start timing of one or more gate driver integrated circuits (GDICs) constituting the gate driving circuit 120. The gate shift clock (GSC), which is a clock signal commonly input to one or more gate driver integrated circuits (GDICs), controls the shift timing of a scan signal. The gate output enable signal (GOE) specifies timing information on one or more gate driver integrated circuits (GDICs).

In addition, in order to control the data driving circuit 130, the controller 140 outputs various data control signals DCS including a source start pulse (SSP), a source sampling clock (SSC), a source output enable signal (SOE), or the like.

In this case, the source start pulse (SSP) controls a data sampling start time of one or more source driver integrated circuits (SDICs) constituting the data driving circuit 130. The source sampling clock (SSC) is a clock signal for controlling the timing of sampling data in the respective source driver integrated circuits (SDICs). The source output enable signal (SOE) controls the output timing of the data driving circuit 130.

The display device 100 may further include a power management integrated circuit for supplying various voltages or currents to the display panel 110, the gate driving circuit 120, the data driving circuit 130, and the like or controlling various voltages or currents to be supplied thereto.

Each subpixel SP may be an area defined by the intersection of the gate line GL and the data line DL, and a liquid crystal or an emission element may be disposed therein depending on the type of the display device 100.

For example, in the case where the display device 100 is a liquid crystal display device, the display device 100 includes a light source device such as a backlight unit for emitting light to the display panel 110, and a liquid crystal is disposed in the subpixel SP of the display panel 110. In addition, because the arrangement of the liquid crystal is adjusted by the electric field produced by the data voltage applied to each subpixel SP, the brightness according to image data may be realized, thereby displaying images.

Figure 2:
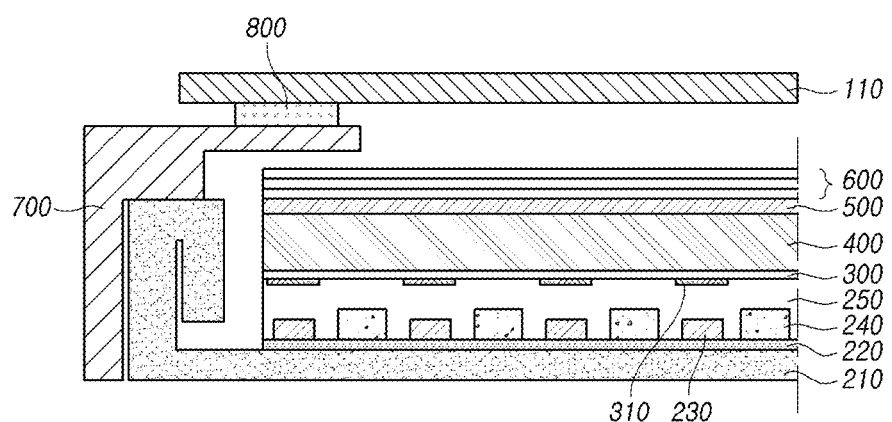
FIG. 2 is a diagram illustrating an example of the structure of a backlight unit included in a display device according to embodiments of the present disclosure.

FIG. 2 is a diagram illustrating an example of the structure of a backlight unit included in a display device 100 according to embodiments of the present disclosure.

Referring to FIG. 2, a display device 100 according to embodiments of the present disclosure may include a display panel 110 and a backlight unit disposed under the display panel 110 and supplying light to the display panel 110.

Various structures may be provided between the backlight unit and the display panel 110, and, for example, the display panel 110 may be fixed to the backlight unit using a guide panel 700, a foam pad 800, and the like, but the disclosure is not limited thereto.

The backlight unit may include a cover bottom 210 for receiving optical elements and the like constituting the backlight unit.

A printed circuit 220 may be disposed on the cover bottom 210, and a plurality of light sources 230 may be arranged on the printed circuit 220.

The printed circuit 220 may be in the form of a substrate, and reflection plates 240 may be disposed in at least some of the areas on the printed circuit 220 in which the light sources 230 are not arranged. That is, the reflection plate 240 may have a plurality of holes formed therein, and the light sources 230 may be disposed in the respective holes.

The light source protector 250 may be disposed on the plurality of light sources 230 and reflection plates 240. The light source protector 250 may protect the plurality of light sources 230, and may provide a function of diffusing the light emitted from the light sources 230. That is, the light source protector 250 may protect the light sources 230 and provide a light guide function while being in contact with the light sources 230.

A transparent film 300 may be disposed on the light source protector 250, and a plurality of light blocking patterns 310 may be arranged on the upper or lower surface of the transparent film 300.

The plurality of light blocking patterns 310 may be arranged on the lower surface of the transparent film 300 so as to correspond to the positions of the respective light sources 230. Alternatively, in some cases, the plurality of light blocking patterns 310 may be arranged at positions corresponding to the respective light sources 230 on the upper surface of the transparent film 300. For example, the respective light blocking patterns 310 may be arranged to correspond to the holes formed in the reflection plate 240. In addition, in some cases, the area of the light blocking pattern 310 may be the same as the area of the hole in the reflection plate 240.

The light blocking pattern 310 may reflect the light emitted in the vertical direction from the light source 230, thereby improving the image quality of the backlight unit.

That is, the light blocking patterns 310 may be arranged in the areas exhibiting the highest intensity of light emitted from the light sources 230, thereby reducing the difference in brightness between the area in which the light source 230 is disposed (an area emitting a large amount of light) and the area between the light sources 230 (an area emitting a small amount of light) and the like.

A diffuser plate 400 may be disposed on the transparent film 300 in order to diffuse the light incident from the bottom thereof.

In addition, a color conversion sheet 500 or one or more optical sheets 600 may be disposed on the diffuser plate 400.

FIGS. 3A to 3E are diagrams illustrating an example of the detailed structure of the backlight unit shown in FIG. 2.

Figure 3A:
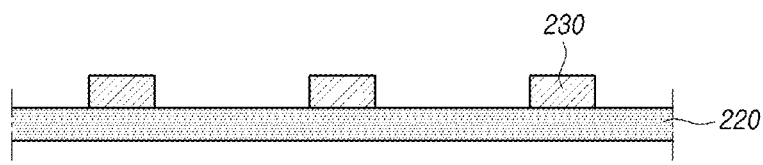
FIGS. 3A to 3E are diagrams illustrating an example of the detailed structure of the backlight unit shown in FIG. 2.

Referring to FIG. 3A, a plurality of light sources 230 is arranged on the printed circuit 220.

The light source 230, for example, may be a light-emitting diode (LED), a compact mini light-emitting diode (Mini LED), or an ultra-compact micro light-emitting diode (μLED). Therefore, the light source 230 in the form of a chip is able to be mounted on the printed circuit 220, thereby reducing the thickness of the backlight unit.

In addition, the light source 230 may emit white light, or in some cases, may emit light in a specific wavelength band (e.g., a wavelength band of blue light).

Figure 3B:
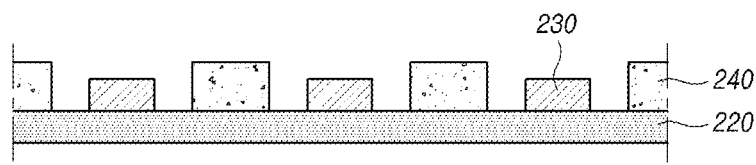

Referring to FIG. 3B, reflection plates 240 may be arranged in at least some of the areas on the printed circuit 220, excluding the areas in which the light sources 230 are arranged.

The reflection plate 240 may have openings (e.g., holes) formed in areas corresponding to the light sources 230, and may then be placed on the printed circuit 220. In addition, the reflection plate 240 may reflect the light emitted from the light source 230 toward the front of the backlight unit, thereby increasing the luminance efficiency of the backlight unit.

Since the light source 230 has a small size in the case where the light source 230 is provided in the form of a chip, the height of the reflection plate 240 may be greater than the height of the light source 230. That is, the upper surface of the reflection plate 240 may be positioned higher than the upper end of the light source 230.

Accordingly, the light emitted in the lateral direction of the light source 230 may be reflected by the side surface of the reflection plate 240 to then travel to the front of the backlight unit, thereby further improving the luminance efficiency of the backlight unit.

In addition, in some cases, a reflection film may be coated on the printed circuit 220.

That is, a reflection film may be coated on the front surface of the printed circuit 220 or in areas excluding the areas in which the light sources 230 are arranged, thereby increasing luminance efficiency.

In this case, the reflection film coated on the printed circuit 220 may replace the reflection plate 240 by performing the functions thereof, or may be disposed together with the reflection plate 240 to together provide a reflecting function.

Figure 3C:
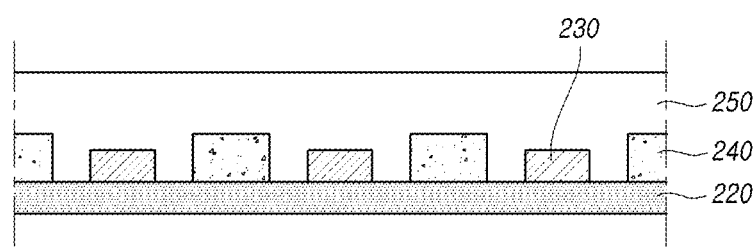

Referring to FIG. 3C, the light source protector 250 may be disposed on a plurality of light sources 230 and reflection plates 240.

The light source protector 250 may be formed of, for example, a resin.

In the case where the light source protector 250 is formed of a resin, partitions may be disposed at the outside of the printed circuit 220 or in the area outside the area in which a plurality of light sources 230 is arranged on the printed circuit 220, and a resin may be coated inside the partitions, thereby forming the light source protector 250.

The light source protector 250 may perform a function of protecting the plurality of light sources 230 arranged on the printed circuit 220, and may provide a light guide function of diffusing the light emitted from the light source 230.

That is, the light emitted from the light source 230 may be spread evenly over the upper surface of the light source protector 250 by the light source protector 250.

Embodiments of the present disclosure are able to further improve the uniformity of images while reducing the thickness of the backlight unit by providing, on the light source protector 250, the light blocking patterns 310 at positions corresponding to the light sources 230.

Figure 3D:
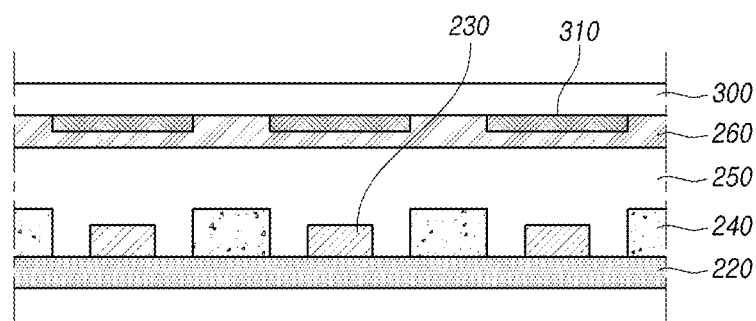

Referring to FIG. 3D, a transparent film 300 may be disposed on the light source protector 250, and a plurality of light blocking patterns 310 may be arranged on the lower surface of the transparent film 300. In addition, the transparent film 300 may be bonded onto the light source protector 250 through an adhesive layer 260. The transparent film 300 may be formed of, for example, PET or the like, but the disclosure is not limited thereto.

The plurality of light blocking patterns 310 on the lower surface of the transparent film 300 may be arranged to correspond to the plurality of light sources 230 disposed on the printed circuit 220, respectively.

That is, the light blocking patterns 310 may be arranged to overlap, at least in part, the light sources 230, and may be arranged to overlap the areas including the areas in which the light sources 230 are arranged in consideration of diffusion characteristics of light.

The light blocking pattern 310 may have constant reflectance, and may scatter, reflect, or diffract the light emitted from the light source 230.

For example, the light blocking patterns 310 may scatter the light emitted from the light sources 230 such that the light travels in the vertical direction and in the diagonal direction. Alternatively, the light blocking patterns 310 may reflect the light emitted in the vertical direction from the light sources 230, and may allow the same to be reflected again by the reflection plates 240 so that the light travels through the area between the light sources 230.

As described above, the light blocking patterns 310 may adjust the emission direction of the light emitted in the vertical direction from the light sources 230, thereby improving the image quality of the backlight unit.

Figure 3E:
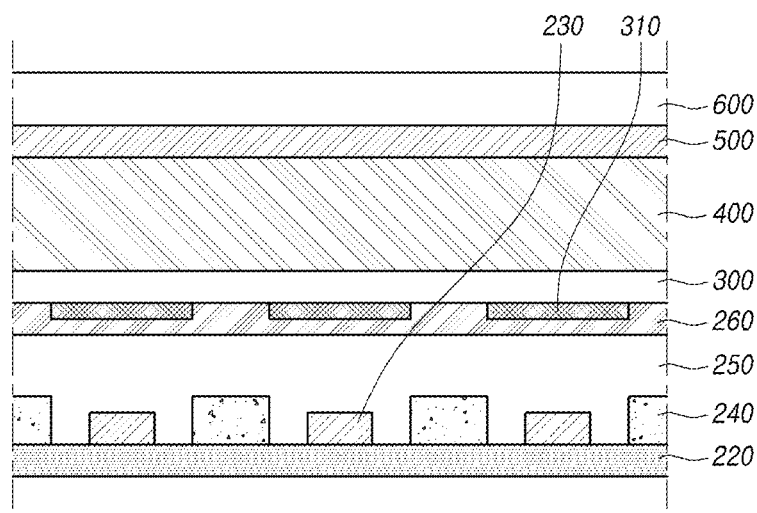

Referring to FIG. 3E, a diffuser plate 400 may be disposed on the transparent film 300, and a color conversion sheet 500 may be disposed on the diffuser plate 400. In addition, one or more optical sheets 600 may be disposed on the color conversion sheet 500.

In this case, the sequence in which the diffuser plate 400 and the color conversion sheet 500 are disposed may be changed.

The diffuser plate 400 diffuses the light emitted through the transparent film 300.

The color conversion sheet 500 may react to the incident light, thereby emitting light in a specific wavelength band.

For example, in the case where the light source 230 emits light in a first wavelength band (e.g., blue light), the color conversion sheet 500 may react to the incident light to then emit light in a second wavelength band (e.g., green light) and light in a third wavelength band (e.g., red light).

In some cases, the color conversion sheet 500 may be disposed only on a portion of the area of the diffuser plate 400.

For example, in the case where the light source 230 emits blue light, the color conversion sheets 500 may be disposed only in areas on the display panel 110, excluding the areas corresponding to the areas in which blue subpixels SP are arranged. That is, the light that has not passed through the color conversion sheet 500 may reach the blue subpixel SP of the display panel 110.

The color conversion sheet 500 may not be provided depending on the light sources 230.

For example, in the case where the light source 230 emits white light, or in the case where a color conversion film for releasing green light and red light is coated on the emission surface of the light source 230 that emits blue light, the color conversion sheet 500 may not be provided.

As described above, embodiments of the present disclosure may provide a backlight unit that includes a transparent film 300 including light blocking patterns 310 arranged at positions corresponding to the light sources 230 and a plurality of optical elements, thereby achieving desired image quality while reducing the thickness of the backlight unit.

Hereinafter, embodiments of the present disclosure will be described along with the detailed example of the light blocking pattern 310 disposed on the transparent film 300.

Figure 4:
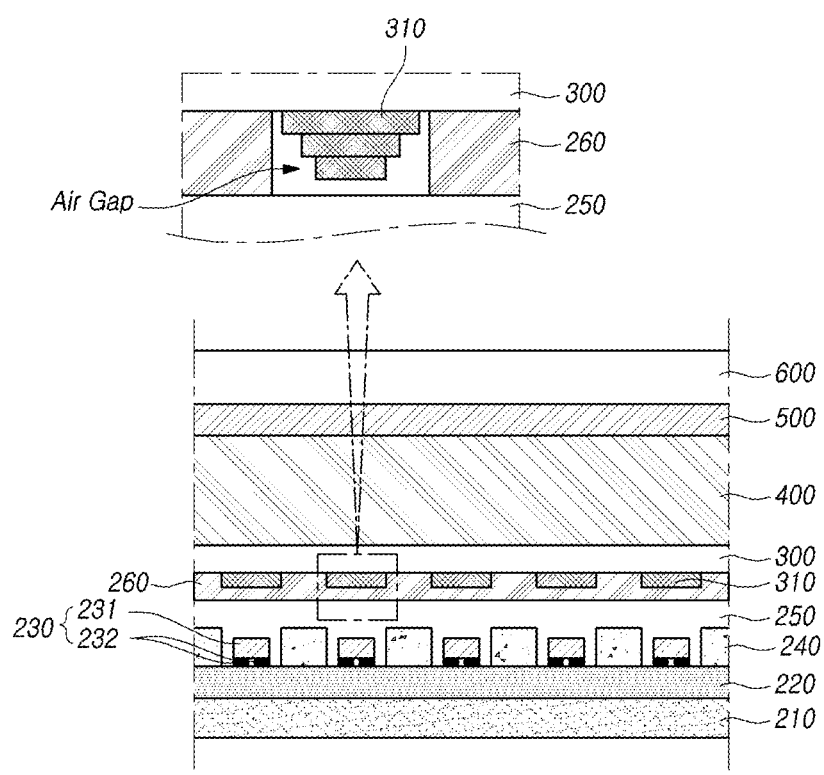
FIG. 4 is a diagram illustrating an example of the structure of light blocking patterns included in a backlight unit according to embodiments of the present disclosure.

FIG. 4 is a diagram illustrating an example of the structure of a light blocking pattern 310 included in a backlight unit according to embodiments of the present disclosure.

Referring to FIG. 4, a printed circuit 220 may be disposed on a cover bottom 210, and the printed circuit 220, for example, may be bonded onto the cover bottom 210 using a piece of adhesive tape interposed between the cover bottom 210 and the printed circuit 220.

A plurality of light sources 230 may be arranged on the printed circuit 220, and reflection plates 240 may be arranged in at least some of the areas on the printed circuit 220, excluding the areas in which the light sources 230 are arranged.

The light source 230, for example, may be a light-emitting diode (LED), and may include a light-emitting portion 231 including an n-type semiconductor layer, an activation layer, and a p-type semiconductor layer, and an electrode portion 232.

A light source protector 250 is disposed on the plurality of light sources 230 and reflection plates 240.

A transparent film 300 may be disposed on the light source protector 250, and light blocking patterns 310 may be arranged at positions corresponding to the light sources 230 on the lower surface of the transparent film 300. In addition, a diffuser plate 400, a color conversion sheet 500, and an optical sheet 600 may be disposed on the transparent film 300.

The light blocking patterns 310 arranged on the lower surface of the transparent film 300 may be implemented by printing a material having a light blocking property on the transparent film 300, and for example, the light blocking patterns 310 may be provided by a method of printing $TiO_2$ ink on the transparent film 300.

In addition, the light blocking patterns 310 arranged on the lower surface of the transparent film 300 may have a single-layered structure or a multi-layered structure.

That is, as shown in the example in FIG. 4, the light blocking patterns 310 arranged on the lower surface of the transparent film 300 may include three layers.

The above light blocking pattern 310 may be implemented by a method of printing a light blocking material three times on the transparent film 300, and the area of the printed light blocking material may be gradually reduced. In addition, the transparent film 300 in which the light blocking patterns 310 are arranged may be placed, in an inverted state, on the light source protector 250, so that the light blocking patterns 310 may be arranged on the light sources 230.

Accordingly, the area of the light blocking pattern 310 may be reduced moving downwards from the transparent film 300, and the thickness of the central area of the light blocking pattern 310 may be greater than the thickness of the outer area thereof.

That is, since the light emitted from the light source 230 in the vertical direction has the highest intensity, the central area of the light blocking pattern 310 may be formed to be thicker.

As described above, the light blocking patterns 310 arranged on the light sources 230 may block the light emitted from the light sources 230 in the vertical direction, thereby preventing hot spots from occurring in the areas in which the light sources 230 are arranged.

The transparent film 300 on which the light blocking patterns 310 are arranged may be bonded onto the light source protector 250 using an adhesive layer 260.

In this case, the adhesive layer 260 may be provided in at least some of the areas on the lower surface of the transparent film 300, excluding the areas in which the light blocking patterns 310 are arranged.

Accordingly, the adhesive layer 260 may not be provided in the areas in which the light blocking patterns 310 are arranged, and an air gap may be provided between the light blocking pattern 310 and the light source protector 250.

In addition, the side surface of the light blocking pattern 310 and the adhesive layer 260 may be spaced apart from each other.

Since the air gap is provided between the light blocking pattern 310 and the light source protector 250, the light emitted in the lateral direction of the light blocking pattern 310 may be reflected by the air gap.

That is, the light emitted in the lateral direction of the light blocking pattern 310 may travel at a large refractive angle due to the air layer having a low refractivity, or may be reflected from the air layer. In addition, the light reflected from the air layer is reflected and emitted again by the reflection plate 240, thereby improving luminance efficiency while assisting the light blocking function of the light blocking pattern 310.

As described above, it is possible to improve the luminance efficiency of the backlight unit while preventing hot spots through a structure in which the light blocking pattern 310 and the air gap are provided at positions corresponding to the light sources 230.

In this case, the light blocking patterns 310 on the lower surface of the transparent film 300 may be arranged in different structures depending on the arrangement positions.

Figure 5A:
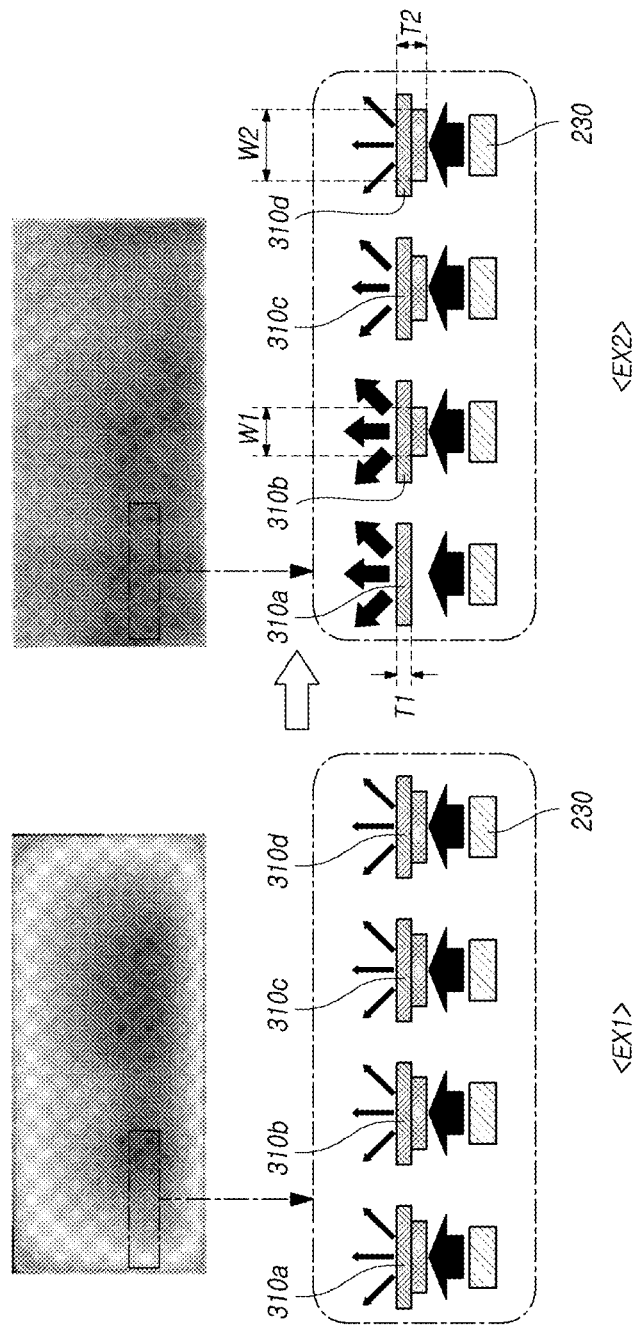
FIGS. 5A and 5B are diagrams illustrating an example of the structure of light blocking patterns included in a backlight unit depending on the arrangement positions thereof according to embodiments of the present disclosure.
Figure 5B:
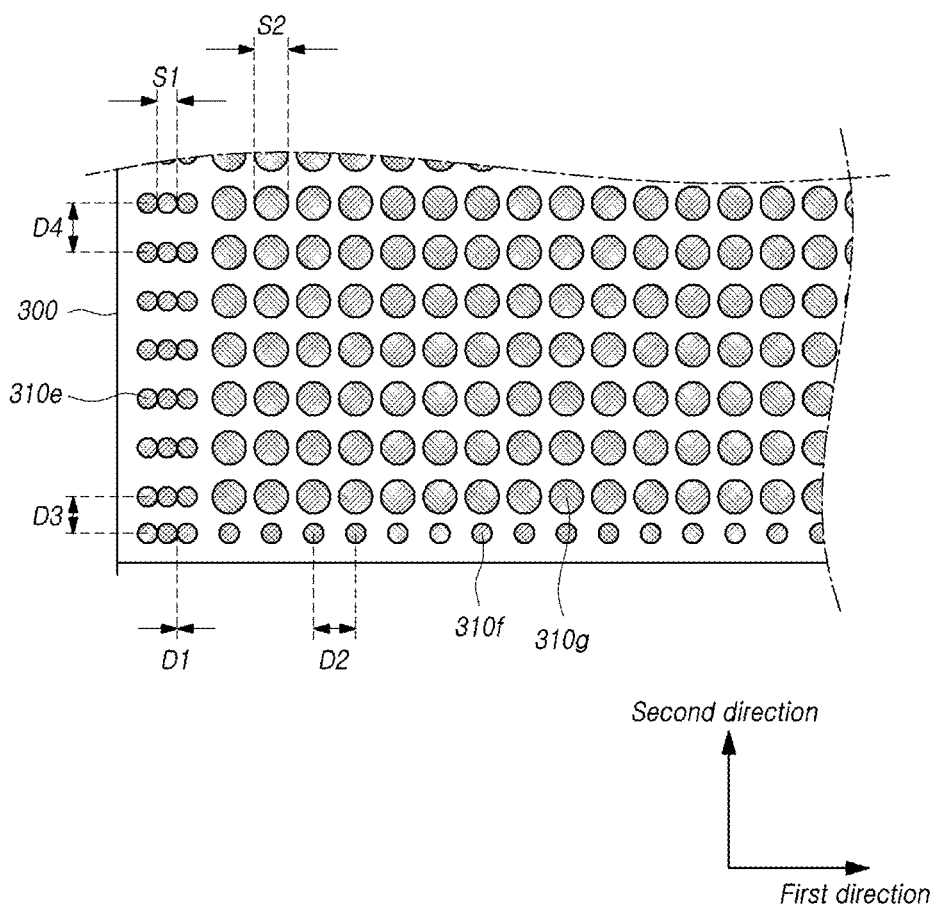

FIGS. 5A and 5B are diagrams illustrating an example of the structure of light blocking patterns 310 included in a backlight unit depending on the arrangement positions thereof according to embodiments of the present disclosure.

FIG. 5A illustrates an example of the brightness provided by the backlight unit depending on the structures of the light blocking patterns 310, in which EX1 shows an example of the measured brightness in the case where the light blocking patterns 310 are arranged in a specific structure and EX2 shows an example of the measured brightness in the case where the light blocking patterns 310 are arranged in different structures according to the positions thereof.

As shown in EX1 of FIG. 5A, if the structure of the light blocking pattern 310a disposed in the outer area of the backlight unit is the same as the structure of the light blocking pattern 310d disposed in the central area thereof, the brightness in the outer area of the backlight unit may be low.

That is, since the outer area of the backlight unit has a relatively small number of light sources 230 supplying light thereto, if the light blocking patterns 310 having the same light blocking capability are arranged, the brightness in the outer area of the backlight unit may be lower than that of the central area of the backlight unit.

Accordingly, as shown in EX2 of FIG. 5A, the light blocking pattern 310a disposed in the outer area of the backlight unit and the light blocking pattern 310d disposed in the central area thereof may be configured to have different structures, thereby preventing degradation of the brightness in the outer area of the backlight unit and providing uniform brightness over the entire backlight unit.

For example, the light blocking patterns 310 may be configured such that the thickness T1 of the light blocking pattern 310a disposed in the outer area of the backlight unit is smaller than the thickness T2 of the light blocking pattern 310d disposed in the central area thereof.

Alternatively, the light blocking patterns 310 may be configured such that the area W1 of the thickest portion in the light blocking pattern 310b disposed adjacent to the outer area of the backlight unit is smaller than the area W2 of the thickest portion in the light blocking pattern 310d. That is, the portion of the light blocking pattern 310a, disposed in the outer area of the backlight unit and the light blocking pattern 310b adjacent to the outer area, that exhibits high blocking capability may have a small area.

In addition, the light blocking patterns 310 may be arranged such that the thickness of the light blocking pattern 310 gradually decreases or such that the area of the thickest portion of the light blocking pattern 310 gradually decreases moving from the central area to the outer area of the backlight unit.

In addition, in some cases, the light blocking patterns 310 may be arranged to be different in such a manner that the number of light sources 230 or the distance between the light sources 230 are different between the central area and the outer area of the backlight unit.

Referring to FIG. 5B, another example of the structure in which the light blocking patterns 310 are arranged on the lower surface of the transparent film 300 is illustrated.

In FIG. 5B, the distance between the light sources 230 disposed in the outer area of the backlight unit may be less than the distance between the light sources 230 disposed in the central area of the backlight unit. That is, the light sources 230 may be arranged to be denser in the outer area of the backlight unit so that the brightness is uniform between the central area and the outer area of the backlight unit.

In addition, since the light blocking patterns 310 are arranged on the lower surface of the transparent film 300 so as to correspond to the light sources 230, the distance between the light blocking patterns 310 disposed in the outer area of the backlight unit may be different from the distance between the light blocking patterns 310 disposed in the central area of the backlight unit.

For example, the distance D1 between the light blocking patterns 310, in a first direction, disposed in the outer area of the backlight unit may be smaller than the distance D2 between the light blocking patterns 310, in the first direction, disposed in the central area thereof. In addition, the distance D3 between the light blocking patterns 310, in a second direction, disposed in the outer area of the backlight unit may be smaller than the distance D4 between the light blocking patterns 310, in the second direction, disposed in the central area thereof.

In this case, the size, the thickness, or the like of the light blocking pattern 310 disposed in the outer area of the backlight unit may be different from the size, the thickness, or the like of the light blocking pattern 310 disposed in the central area of the backlight unit.

For example, as shown in FIG. 5B, the size S1 of the light blocking patterns 310e and 310f disposed in the outer area of the backlight unit may be smaller than the size S2 of the light blocking pattern 310g disposed in the central area of the backlight unit.

Alternatively, the light blocking pattern 310 may have a multi-layer structure as described above, and in this case, the thicknesses of the light blocking patterns 310e and 310f disposed in the outer area of the backlight unit or the area of the thickest portion thereof may be smaller than the thickness of the light blocking pattern 310g disposed in the central area of the backlight unit or the area of the thickest portion thereof.

That is, since the light blocking patterns 310e and 310f disposed in the outer area of the backlight unit have small sizes, the light blocking patterns may be arranged to correspond to the light sources 230 arranged at narrow intervals. Accordingly, it is possible to prevent hot spots from occurring at the positions corresponding to the light sources 230 in the outer area of the backlight unit.

In addition, it is possible to increase the amount of emitted light and to prevent degradation of brightness in the outer area of the backlight unit by reducing the degree of blocking of the light emitted from the light source 230 in the outer area of the backlight unit, thereby providing uniform brightness over the entire area of the backlight unit.

As described above, it is possible to prevent degradation of brightness in the outer area of the backlight unit and to improve the uniformity of brightness by configuring the structure of the light blocking pattern 310 to be different for respective areas of the backlight unit.

In addition, it is possible to prevent hot spots in the backlight unit and to improve the uniformity of brightness through the structure in which the light blocking patterns 310 are arranged as described above.

In addition, embodiments of the present disclosure may improving the luminance efficiency of the backlight unit supplying white light by converting the wavelength of light emitted from the light source 230 through the structure in which light is able to be reflected inside the color conversion sheet 500.

FIG. 6 is a diagram illustrating an example of the structure of a color conversion sheet 500 included in a backlight unit according to embodiments of the present disclosure.

Referring to FIG. 6, the backlight unit may include a plurality of light sources 230 arranged on a printed circuit 220. In addition, the light source 230 may emit blue light.

A light source protector 250, a transparent film 300 on which light blocking patterns 310 are arranged, and the like may be disposed on the light sources 230. In addition, the color conversion sheet 500 may be disposed on the light source 230.

A color conversion sheet 500 may excite the blue light emitted from the light source 230, thereby releasing green light and red light. Accordingly, the blue light emitted from the light source 230 may be excited by the color conversion sheet 500, thereby supplying white light to the display panel 110.

The color conversion sheet 500 may include a color conversion layer 510 that reacts to blue light, thereby emitting green light and red light.

The color conversion layer 510 may include, for example, a plurality of phosphors that excite blue light and then release green light or red light. In addition, the color conversion layer 510 may include a plurality of beads or the like for scattering the light excited by the phosphors.

In addition, the color conversion sheet 500 may further include a first reflection filter 520 disposed on the upper surface of the color conversion layer 510, as shown in the example denoted by (A) in FIG. 6.

The first reflection filter 520 may have reflectance with respect to light in a specific wavelength band, and, for example, may have reflectance with respect to blue light emitted from the light source 230. In addition, the first reflection filter 520 may transmit green light and red light therethrough.

Here, the reflectance of the first reflection filter 520 with respect to the blue light may be less than 100%.

Accordingly, a portion of the blue light reaching the first reflection filter 520 may pass through the same, and another portion thereof may be reflected by the first reflection filter 520.

That is, the first reflection filter 520 may be provided in the path along which the blue light emitted from the light source 230 travels by passing through the color conversion layer 510, and may reflect the portion of the blue light whose wavelength has not been converted by the color conversion layer 510.

In addition, the blue light reflected by the first reflection filter 520 may return to the color conversion layer 510 and then be excited into green light or red light.

Accordingly, it is possible to increase the amount of green light and red light emitted from the color conversion sheet 500. In particular, it is possible to improve the overall brightness of the white light supplied by the backlight unit by increasing the amount of green light, which greatly affects the brightness.

In addition, even if the blue light reflected by the first reflection filter 520 is not excited into green light or the like, the blue light may be reflected by the reflection plate 240 disposed on the printed circuit 220, and may then travel toward the display panel 110. In addition, the blue light reflected by the reflection plate 240 may again pass through the color conversion layer 510, and the blue light may be excited into green light or red light in the process of passing through the color conversion layer 510.

Meanwhile, the green light and the red light excited by the color conversion layer 510 may be emitted upwards from the color conversion sheet 500, but in some cases, the green light and the red light may be emitted downwards from the color conversion sheet 500.

Accordingly, embodiments of the present disclosure further include a second reflection filter 530 disposed under the color conversion layer 510 in a structure of the color conversion sheet 500 in which the probability of excitation of green light and red light is increased by providing the first reflection filter 520, thereby increasing the amount of light supplied to the display panel 110.

For example, as shown in the example denoted by (B) in FIG. 6, the color conversion sheet 500 may include a color conversion layer 510 that excites blue light, thereby emitting green light and red light, a first reflection filter 520 disposed on the upper surface of the color conversion layer 510, and a second reflection filter 530 disposed on the lower surface of the color conversion layer 510.

As described above, the first reflection filter 520 disposed on the upper surface of the color conversion layer 510 may have reflectance with respect to the blue light emitted from the light source 230. In addition, the first reflection filter 520 may exhibit transflection with respect to blue light, and may allow green light and red light to pass therethrough.

The second reflection filter 530 disposed on the lower surface of the color conversion layer 510 may have reflectance with respect to green light and red light. In addition, the second reflection filter 530 may transmit blue light therethrough.

Here, the reflectance of the second reflection filter 530 for green light and red light may approximate 100%. That is, the reflectance of the second reflection filter 530 for green light and red light may be higher than the reflectance of the first reflection filter 520 for blue light.

Since the first reflection filter 520 exhibiting transflection with respect to blue light is disposed on the upper surface of the color conversion layer 510, the portion of the blue light, which has not been excited into green light or red light in the color conversion layer 510, may be reflected by the first reflection filter 520.

As the blue light reflected by the first reflection filter 520 is transmitted to the color conversion layer 510, the probability of exciting the blue light emitted from the light source 230 into green light or red light may increase.

In addition, since the second reflection filter 530, which is reflective of green light and red light, is disposed on the lower surface of the color conversion layer 510, the green light or the red light emitted from the color conversion layer 510 may be reflected by the second reflection filter 530.

That is, the light scattered backwards, among the green light and the red light, which is emitted from the light source 230 and excited by the color conversion layer 510 or which is reflected by the first reflection filter 520 and excited by the color conversion layer 510, may be reflected by the second reflection filter 530.

Accordingly, it is possible to increase the probability of exciting blue light by the first reflection filter 520 and to increase the amount of green light and red light supplied to the display panel 110 by the second reflection filter 530, thereby improving the luminance efficiency of the backlight unit and the brightness provided by the backlight unit.

FIG. 7 is a diagram illustrating an example of a path of light through a color conversion sheet 500 according to embodiments of the present disclosure on the basis of the structure denoted by (B) in FIG. 6.

Referring to FIG. 7, the color conversion sheet 500 may include a color conversion layer 510 that excites blue light and then emits green light and red light, and first and second reflection filters 520 and 530 disposed on the upper and lower surfaces of the color conversion layer 510, respectively.

The first reflection filter 520 may have reflectance with respect to blue light. For example, as shown in the graph of reflectance and wavelengths in FIG. 7, the first reflection filter 520 may exhibit transflection with respect to blue light, and may transmit green light and red light therethrough. That is, the graph of reflectance and wavelengths in FIG. 7 shows that as the Y-axis value approaches 1, close to 100% of the light of the corresponding wavelength is reflected.

The second reflection filter 530 may have reflectance with respect to green light and red light. For example, as shown in the graph of reflectance and wavelengths in FIG. 7, the second reflection filter 530 may have high reflectance with respect to green light and red light, and may transmit blue light therethrough.

If the blue light emitted from the light source 230 disposed under the color conversion sheet 500 reaches the color conversion layer 510 of the color conversion sheet 500, the blue light may be excited by the phosphor or the like included in the color conversion layer 510 so that green light and red light are emitted as shown in the example denoted by ① in FIG. 7.

In addition, the blue light, which has not been excited by the color conversion layer 510, may be emitted upwards from the color conversion layer 510. At this time, since the first reflection filter 520 disposed on the color conversion layer 510 exhibits transflection with respect to blue light, a portion of the blue light may pass through the first reflection filter 520 to the outside as shown in the example denoted by ② in FIG. 7. Accordingly, white light may be supplied to the display panel 110 by the blue light emitted upwards from the color conversion sheet 500 and the green and red light excited and emitted by the color conversion layer 510.

In addition, a portion of the blue light, which has not been excited by the color conversion layer 510, may be reflected by the first reflection filter 520. Here, the blue light reflected by the first reflection filter 520 may return to the color conversion layer 510, and may be excited into green light or red light as shown in the example denoted by ③ in FIG. 7.

That is, the probability of exciting blue light by the first reflection filter 520 may increase.

Accordingly, the amount of green light and red light supplied to the display panel 110 may be increased to thus improve brightness. Alternatively, in some cases, it may be possible to maintain the same brightness while reducing the amount of phosphor included in the color conversion layer 510.

In addition, the green light and the red light emitted from the color conversion layer 510 toward the light source 230 may be reflected by the second reflection filter 530 as shown in the example denoted by ④ in FIG. 7.

It is possible to improve the luminance efficiency of the backlight unit while increasing the brightness of the light emitted through the color conversion sheet 500 by increasing the probability of exciting blue light using the first reflection filter 520 and by reflecting the green light and the red light scattered backwards to the front using the second reflection filter 530 as described above.

Figure 8:
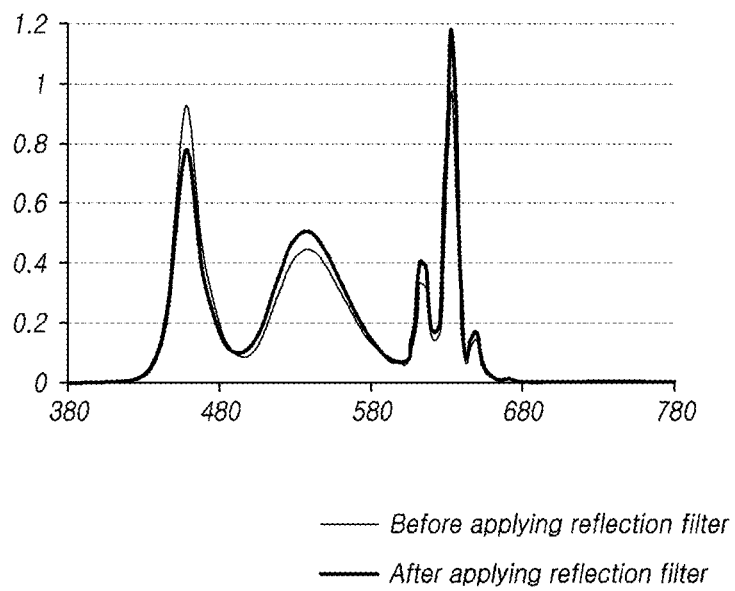
FIG. 8 is a diagram illustrating the effect of improving the intensity of light by a color conversion sheet according to embodiments of the present disclosure.

FIG. 8 is a diagram illustrating the effect of improving the intensity of light by a color conversion sheet 500 according to embodiments of the present disclosure.

FIG. 8 shows the intensity of light for respective wavelengths, which has passed through the color conversion sheet 500 described above. Since the first reflection filter 520 exhibiting transflection with respect to blue light is disposed on the top of the color conversion sheet 500, the intensity of the blue light emitted through the color conversion sheet 500 may be reduced.

In addition, the blue light reflected by the first reflection filter 520 may be excited into green light or red light and the second reflection filter 530 disposed under the color conversion sheet 500 may reflect the green light and the red light, thereby increasing the intensity of the green light and the red light emitted through the color conversion sheet 500.

The blue light is used to supply white light to the display panel 110, and may not affect the brightness even if the intensity of the blue light emitted through the color conversion sheet 500 is slightly reduced.

On the other hand, the intensity of the green light and the red light for realizing white light may be increased, and in particular, as the intensity of green light that has a significant effect on the brightness is increased, it is possible to improve the brightness provided by the backlight unit using the same color conversion layer 510.

Alternatively, while reducing the amount of phosphor included in the color conversion layer 510, the backlight unit may exhibit the same brightness.

That is, it is possible to increase the brightness or luminance efficiency of the backlight unit by providing a color conversion sheet 500 having a structure in which the phosphor included in the color conversion layer 510 is able to be efficiently used.

Further, a pattern or sheet for changing the path of the light emitted at a large viewing angle may be disposed on the first reflection filter 520 of the color conversion sheet 500 according to embodiments of the present disclosure.

Figure 9:
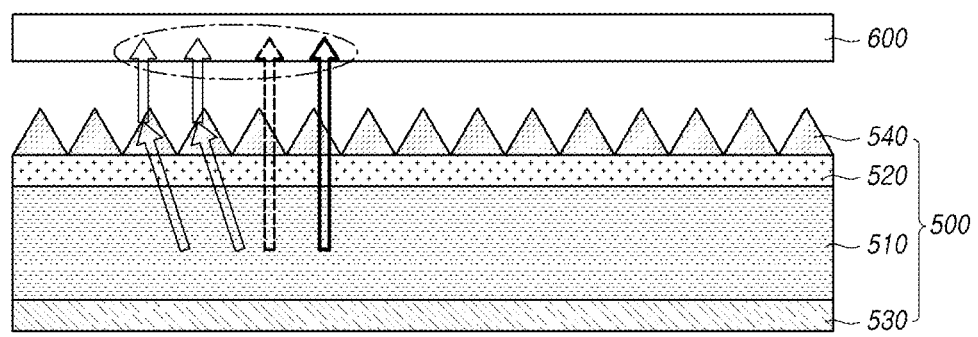
FIG. 9 is a diagram illustrating another example of the structure of a color conversion sheet included in the backlight unit according to embodiments of the present disclosure.

FIG. 9 is a display illustrating another example of the structure of a color conversion sheet 500 included in the backlight unit according to embodiments of the present disclosure.

Referring to FIG. 9, a color conversion sheet 500 according to embodiments of the present disclosure may include a color conversion layer 510 and first and second reflection filters 520 and 530 disposed on the upper surface and lower surface of the color conversion layer 510, respectively.

The color conversion layer 510 may excite blue light, thereby emitting green light and red light. In addition, the first reflection filter 520 may exhibit transflection with respect to blue light, and the second reflection filter 530 may have a feature of reflecting green light and red light.

In addition, the color conversion sheet 500 may further include at least one light collection pattern 540 arranged on the first reflection filter 520. Alternatively, in some cases, a sheet providing a light collecting function may be disposed on the first reflection filter 520.

The light collection pattern 540 may change the path of light emitted upwards from the first reflection filter 520, and, for example, may adjust the path of light emitted at a large viewing angle so as to have a small viewing angle.

In particular, the light collection pattern 540 may provide a function of collecting blue light emitted at a large viewing angle into the central area of the display panel 110 so as to have a small viewing angle.

That is, since the first reflection filter 520, which is reflective of blue light, is disposed on the color conversion sheet 500, the blue light emitted in the vertical direction may be reflected by the first reflection filter 520. Therefore, the amount of blue light emitted at a large viewing angle may be larger than the amount of blue light emitted at a small viewing angle. In addition, the color difference may be recognized due to the difference in the amount of emitted blue light depending on the viewing angle.

Embodiments of the present disclosure may have a light collection pattern 540 or a light collecting sheet placed on the first reflection filter 520 in the structure in which the first reflection filter 520 exhibiting reflection of blue light is disposed on the upper surface of the color conversion layer 510 included in the color conversion sheet 500, thereby preventing a color difference depending on the viewing angle.

Figure 10:
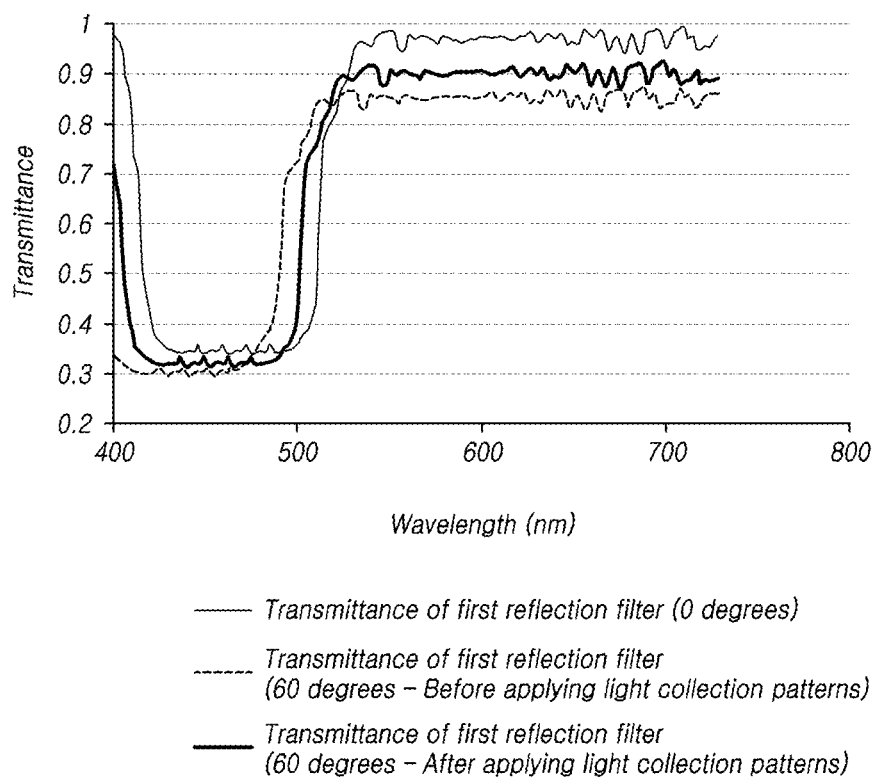
FIG. 10 is a diagram illustrating an example of transmittance depending on viewing angles in the color conversion sheet shown in FIG. 9.

FIG. 10 is a diagram illustrating an example of transmittance depending on the viewing angle in the color conversion sheet 500 shown in FIG. 9.

Referring to FIG. 10, it can be seen that the transmittance for blue light is very low and that the transmittance for green light and red light is high when the viewing angle is 0 degrees. In addition, it is confirmed that the color conversion sheet 500 has transmittance with respect to blue light in some wavelength bands when the viewing angle is 60 degrees and the light collection pattern 540 is not provided.

That is, since the transmittance for blue light differs between the viewing angle of 0 degrees and the viewing angle of 60 degrees, a color difference depending on the viewing angle may be recognized.

On the other hand, in the case where the viewing angle is 60 degrees and the light collection pattern 540 is provided, it can be seen that the transmittance for blue light is changed to be similar to the transmittance in the case where the viewing angle is 0 degrees.

Therefore, by arranging the light collection pattern 540 on the first reflection filter 520 of the color conversion sheet 500, it is possible to prevent a color difference depending on the viewing angle in the case where the first reflection filter 520 exhibiting reflection of blue light is disposed on the top of the color conversion sheet 500. In addition, it is possible to increase brightness in the central area of the display panel 110 by collecting light emitted at a large viewing angle so as to have a small viewing angle.

In addition, according to embodiments of the present disclosure, green light and red light scattered backwards from the color conversion layer 510 of the color conversion sheet 500 may be reflected by the second reflection filter 530 adjacent to the color conversion layer 510, thereby preventing a halo that may be caused by the light scattered backwards.

Figure 11:
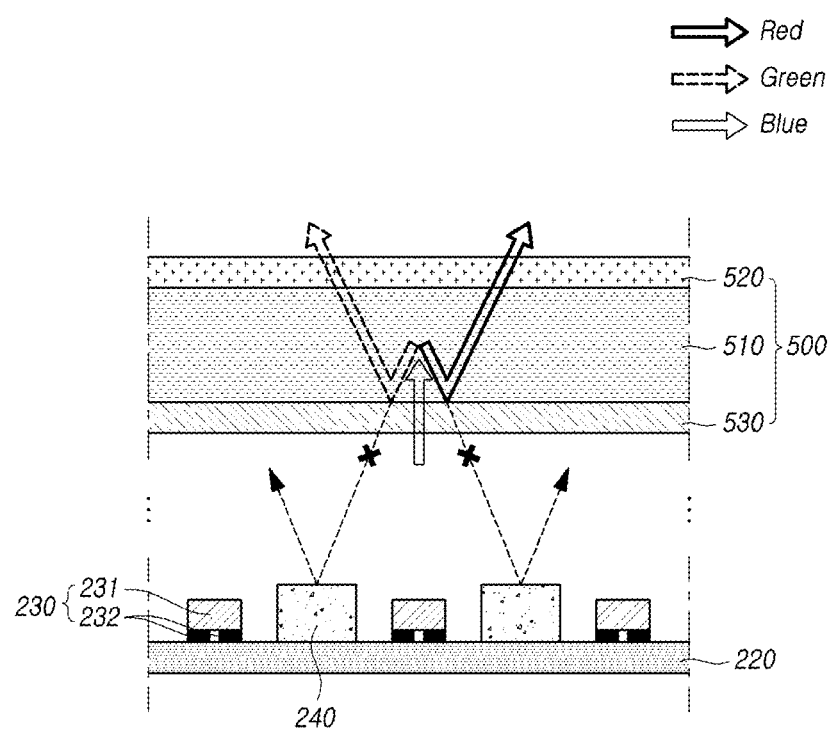
FIG. 11 is a diagram illustrating an example of a change in the path of light by a color conversion sheet according to embodiments of the present disclosure.

FIG. 11 is a diagram illustrating an example of a change in the path of light by a color conversion sheet 500 according to embodiments of the present disclosure.

Referring to FIG. 11, when the blue light emitted from the light source 230 reaches the color conversion sheet 500, the wavelength thereof may be converted by the color conversion layer 510 of the color conversion sheet 500. As a result, green light and red light may be emitted from the color conversion layer 510.

When the green light and the red light emitted from the color conversion layer 510 are scattered backwards, the second reflection filter 530 may reflect the same forwards.

At this time, since the second reflection filter 530 is disposed adjacent to the color conversion layer 510, the green light and the red light scattered backwards from the color conversion layer 510 may travel upwards from the color conversion sheet 500 without spreading out.

That is, in the case where the second reflection filter 530 is not provided, the green light and the red light scattered backwards may be reflected from the reflection plate 240 disposed on the printed circuit 220 to then travel forwards. Therefore, the green light and the red light scattered backwards may be spread out and emitted forwards, thereby causing a halo.

On the other hand, according to embodiments of the present disclosure, the green light and the red light scattered backwards from the color conversion layer 510 may be reflected by the second reflection filter 530 adjacent to the color conversion layer 510 and emitted forwards. Accordingly, it is possible to prevent a halo or a color difference due to the green light and the red light that is scattered backwards, diffused, and then emitted.

Figure 12:
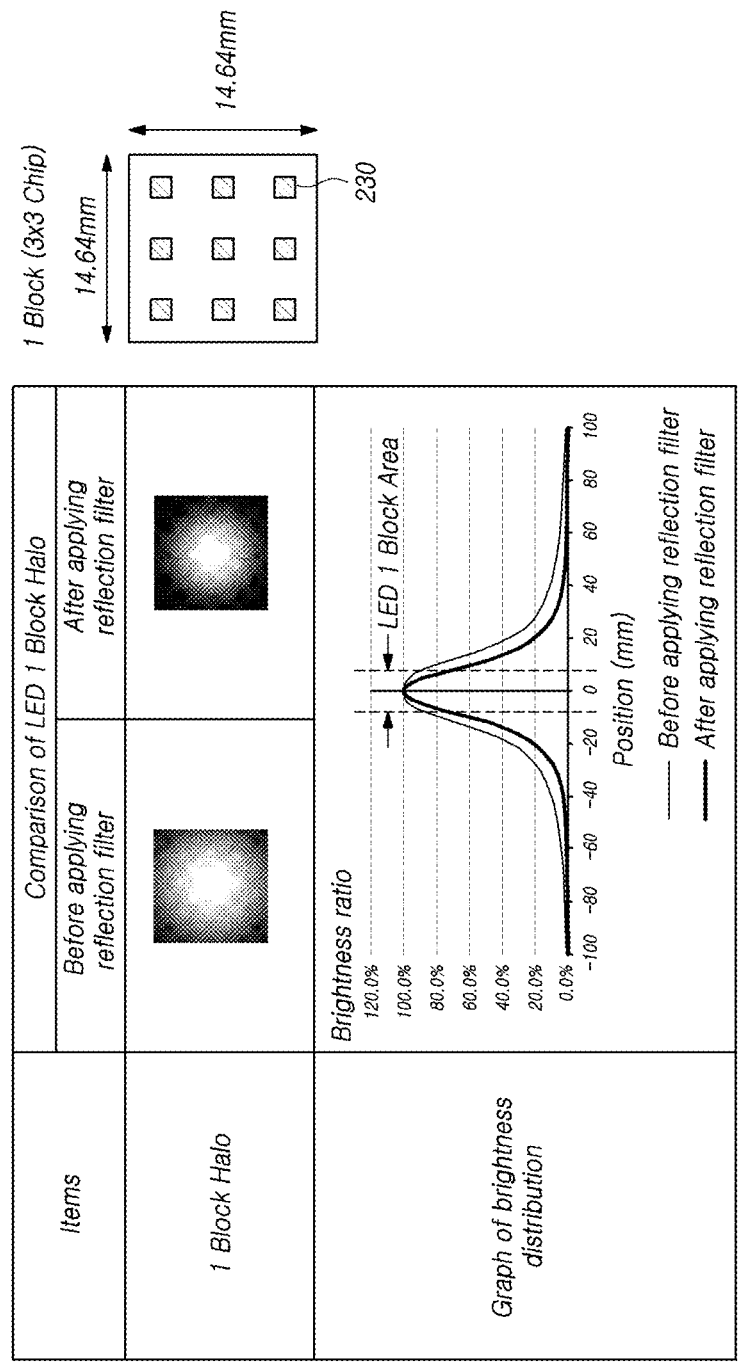
FIG. 12 is a diagram illustrating an effect of attenuating the color difference by a color conversion sheet according to embodiments of the present disclosure.

FIG. 12 is a diagram illustrating the effect of improving the color difference by a color conversion sheet 500 according to embodiments of the present disclosure.

FIG. 12 shows an example in which one block has a size of 14.64 mm×14.64 mm and 9 light sources 230 are arranged in one block.

In addition, FIG. 12 relates to the case where white light is emitted by exciting the blue light emitted from the light source 230 using the color conversion sheet 500.

As shown in the case where a reflection filter is not provided, if the second reflection filter 530 having reflectance with respect to green light and red light is not provided under the color conversion sheet 500, the light scattered backwards from the color conversion sheet 500 may diffuse, thereby causing a halo to appear.

On the other hand, as shown in the case where the reflection filter is provided, if the second reflection filter 530 having reflectance with respect to green light and red light is provided under the color conversion sheet 500, the light scattered backwards may be reflected by the second reflection filter 530, and may then be emitted forwards. Therefore, it is possible to reduce the range in which the light scattered backwards spreads out, thereby preventing the halo caused by the light scattered backwards.

According to the embodiments of the present disclosure described above, the first reflection filter 520 exhibiting transflection with respect to blue light may be disposed on the top of the color conversion sheet 500 that excites blue light and then emits green light and red light, thereby increasing the probability of exciting green light and red light by reusing blue light.

In addition, the second reflection filter 530 exhibiting reflection of green light and red light may be provided under the color conversion sheet 500 so that the green light and the red light scattered backwards may be reflected forwards, thereby preventing a halo caused by the light scattered backwards and increasing the emission efficiency.

Therefore, it is possible to improve the brightness realized by the backlight unit or maintain the same brightness while reducing the content of a color conversion material by improving the color conversion efficiency of the color conversion sheet 500 for supplying white light to the display panel 110.

It will be apparent to those skilled in the art that various modifications and variations can be made in the present disclosure without departing from the technical idea or scope of the disclosure. Thus, it is intended that the present disclosure cover the modifications and variations of this disclosure provided they come within the scope of the appended claims and their equivalents.

What is claimed is:
1. A display device, comprising:
   a display panel; and
   a backlight unit configured to supply light to the display panel, the backlight unit comprising:
      a plurality of light sources configured to emit light in a first wavelength band;

a reflection plate arranged in at least some of areas, excluding the areas in which the light sources are arranged;
a light source protector arranged on the light sources and the reflection plate;
a color conversion sheet provided between the light source and the display panel;
a transparent film provided between the light source protector and the color conversion sheet, the transparent film comprising a plurality of light blocking patterns arranged on a lower surface thereof; and
an adhesive layer provided in at least some of areas, excluding areas where the light blocking patterns are arranged, between the light source protector and the transparent film to be spaced apart from the light blocking pattern, wherein an air gap is provided between the light source protector and the light blocking patterns,
wherein the color conversion sheet comprises:
a color conversion layer configured to:
react to the light in the first wavelength band; and
emit light in a second wavelength band and light in a third wavelength band;
a first reflection filter arranged on an upper surface of the color conversion layer; and
a second reflection filter arranged on a lower surface of the color conversion layer,
wherein the first reflection filter has reflectance for the light in the first wavelength band, and
wherein the second reflection filter has reflectance for the light in the second wavelength band and the light in the third wavelength band.

2. The display device of claim 1, wherein the reflectance of the first reflection filter for the light in the first wavelength band is less than the reflectance of the second reflection filter for the light in the second wavelength band and the light in the third wavelength band.

3. The display device of claim 1, wherein the first reflection filter is configured to transmit a portion of the light in the first wavelength band reaching a bottom of the first reflection filter therethrough.

4. The display device of claim 1, wherein the first reflection filter is configured to transmit the light in the second wavelength band and the light in the third wavelength band therethrough.

5. The display device of claim 1, wherein the second reflection filter is configured to transmit the light in the first wavelength band therethrough.

6. The display device of claim 1,
wherein the plurality of light blocking patterns is arranged to correspond to the plurality of light sources, respectively.

7. The display device of claim 1, wherein a path of light in the first wavelength band entering a lower surface of the first reflection filter at a large viewing angle is adjusted by at least one light collection pattern or a light collecting sheet for the light in the first wavelength band to have a smaller viewing angle.

8. The display device of claim 1, wherein a path of light entering a lower surface of the first reflection filter and emitted from an upper surface of the first reflection filter is changed by at least one light collection pattern arranged on the upper surface of the first reflection filter or a light collecting sheet arranged on the color conversion sheet.

9. A backlight unit, comprising:
a plurality of light sources configured to emit light in a first wavelength band;
a reflection plate arranged in at least some of areas, excluding areas in which the light sources are arranged;
a light source protector arranged on the light sources and the reflection plate;
a transparent film arranged on the light source protector, the transparent film comprising a plurality of light blocking patterns arranged on a lower surface thereof;
an adhesive layer provided in at least some of areas, excluding areas where the light blocking patterns are arranged, between the light source protector and the transparent film to be spaced apart from the light blocking pattern, wherein an air gap is provided between the light source protector and the light blocking patterns; and
a color conversion sheet provided on the transparent film, the color conversion sheet comprising:
a color conversion layer configured to:
react to the light in the first wavelength band; and
emit light in a second wavelength band and light in a third wavelength band;
a first reflection filter arranged on an upper surface of the color conversion layer; and
a second reflection filter arranged on a lower surface of the color conversion layer, and
wherein the first reflection filter has reflectance with respect to the light in the first wavelength band, and
wherein the second reflection filter has reflectance with respect to the light in the second wavelength band and the light in the third wavelength band.

10. The backlight unit of claim 9, wherein the reflectance of the first reflection filter for the light in the first wavelength band is less than the reflectance of the second reflection filter for the light in the second wavelength band and the light in the third wavelength band.

11. The backlight unit of claim 9, wherein the first reflection filter is configured to transmit a portion of the light in the first wavelength band reaching a bottom of the first reflection filter therethrough.

12. A display device, comprising:
a display panel; and
a backlight unit configured to supply light to the display panel, the backlight unit comprising:
a plurality of light sources configured to emit light in a first wavelength band;
a reflection plate arranged in at least some of areas, excluding the areas in which the light sources are arranged, wherein an upper surface of the reflection plate is positioned higher than an upper end of the light sources;
a light source protector arranged on the light sources and the reflection plate;
a color conversion sheet provided between the light source and the display panel;
a transparent film provided between the light source protector and the color conversion sheet, the transparent film comprising a plurality of light blocking patterns arranged on a lower surface thereof; and
an adhesive layer provided between the light source protector and the transparent film, wherein a gap is provided between the light source protector and the light blocking patterns,
wherein the color conversion sheet comprises:
a color conversion layer configured to:
react to the light in the first wavelength band; and
emit light in a second wavelength band and light in a third wavelength band;

a first reflection filter arranged on an upper surface of the color conversion layer; and a second reflection filter arranged on a lower surface of the color conversion layer, wherein the first reflection filter has reflectance for the light in the first wavelength band, and wherein the second reflection filter has reflectance for the light in the second wavelength band and the light in the third wavelength band.

* * * * *